United States Patent
Wilkes et al.

(12) 
(10) Patent No.: US 6,225,363 B1
(45) Date of Patent: *May 1, 2001

(54) FOAMABLE COMPOSITION USING HIGH DENSITY POLYETHYLENE

(75) Inventors: Gary R. Wilkes, Okemos, MI (US); Ronnie D. Kisner; Jeffrey J. Stimler, both of Queensbury, NY (US)

(73) Assignee: Pactiv Corporation, Glen Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/481,260

(22) Filed: Jan. 11, 2000

Related U.S. Application Data

(63) Continuation-in-part of application No. 09/056,401, filed on Apr. 7, 1998, now Pat. No. 6,069,183.

(51) Int. Cl.$^7$ .................................................. C08J 9/00
(52) U.S. Cl. .............................. 521/81; 521/134; 521/139; 525/240
(58) Field of Search ............................ 521/81, 139, 134; 515/240

(56) References Cited

U.S. PATENT DOCUMENTS

| | | | |
|---|---|---|---|
| 3,432,447 | 3/1969 | Patterson et al. | 260/2.5 |
| 3,644,230 | 2/1972 | Cronin | 260/2.5 |
| 3,863,000 | 1/1975 | Kasai et al. | 264/45.5 |
| 4,217,319 | 8/1980 | Komori | 264/53 |
| 4,255,372 | 3/1981 | Kühnel et al. | 264/54 |
| 4,289,857 | 9/1981 | Hoki et al. | 521/85 |
| 4,331,779 | 5/1982 | Park | 521/134 |
| 4,343,913 | 8/1982 | Watanabe et al. | 521/94 |
| 4,345,041 | 8/1982 | Hoki et al. | 521/94 |
| 4,359,539 | 11/1982 | Hoki et al. | 521/79 |
| 4,369,257 | 1/1983 | Hoki et al. | 521/79 |
| 4,528,300 | 7/1985 | Park | 521/79 |
| 4,569,950 | 2/1986 | Hoshi et al. | 521/88 |
| 4,640,933 * | 2/1987 | Park | 521/139 |
| 4,644,013 | 2/1987 | Fujie et al. | 521/60 |
| 4,652,590 | 3/1987 | Hoki et al. | 521/139 |
| 4,663,361 * | 5/1987 | Park | 521/139 |
| 4,694,027 * | 9/1987 | Park | 521/139 |
| 4,847,150 | 7/1989 | Takeda | 428/318.8 |
| 5,059,376 | 10/1991 | Pontiff et al. | 264/234 |
| 5,089,533 | 2/1992 | Park | 521/79 |
| 5,124,097 | 6/1992 | Malone | 264/51 |
| 5,225,451 * | 7/1993 | Rogers et al. | 521/139 |
| 5,290,822 * | 3/1994 | Rogers et al. | 521/139 |
| 5,348,984 | 9/1994 | Lee | 521/79 |
| 5,424,016 | 6/1995 | Kolosowski | 264/156 |
| 5,460,818 | 10/1995 | Park et al. | 426/415 |
| 5,462,974 | 10/1995 | Lee | 521/79 |
| 5,585,058 | 12/1996 | Kolosowski | 264/156 |
| 5,667,928 | 9/1997 | Thomas et al. | 430/134 |
| 6,069,183 * | 5/2000 | Wilkes et al. | 521/139 |

FOREIGN PATENT DOCUMENTS

| | | | |
|---|---|---|---|
| 42 01 763 | 1/1991 | (DE) | C08L/23/02 |
| 0 647 673 A2 | 10/1986 | (EP) | C08J/9/14 |
| 0 585 147 A1 | 7/1993 | (EP) | C08J/9/00 |
| 51-41149 | 11/1976 | (JP) . | |
| 3-63123 | 3/1991 | (JP) . | |
| 2623136 | 4/1997 | (JP) . | |
| 9231337 | 9/1997 | (JP) . | |

OTHER PUBLICATIONS

*A Developmental HDPE Foam Resin* by V. Firdaus, P.P. Tong, K.K. Cooper and Mobil Chemical Company, Edison NJ, pp. 1931–1936 (1996).

* cited by examiner

*Primary Examiner*—Morton Foelak
(74) *Attorney, Agent, or Firm*—Jenkens & Gilchrist

(57) ABSTRACT

A polymeric composition to be used in producing foam in which the polymeric composition comprises high density polyethylene, alkenyl aromatic polymer and a resiliency modifier resin. The high density polyethylene is in an amount of from about 5 to 45 weight percent of the polymeric composition. The high density polyethylene has a z-average molecular weight, $M_z$, greater than about 1,000,000. The alkenyl aromatic polymer is in the amount of from about 3 to about 45 weight percent of the polymeric composition. The resiliency modifier resin is in the amount of from 10 to about 85 weight percent of the polymeric composition.

58 Claims, No Drawings

FOAMABLE COMPOSITION USING HIGH DENSITY POLYETHYLENE

RELATED APPLICATION

This application is a continuation-in-part under 37 C.F.R. § 1.53(b) of U.S. patent application Ser. No. 09/056,401, filed Apr. 7, 1998, and issued as U.S. Pat. No. 6,069,183.

FIELD OF THE INVENTION

The present invention is directed to a polymeric composition to be used in producing foam. Specifically, the polymeric composition is comprised of a high density polyethylene, an alkenyl aromatic polymer and a resiliency modifier resin.

BACKGROUND OF THE INVENTION

Low density foam, such as polystyrene foam, is commonly made by combining a physical blowing agent with a molten polymeric mixture under pressure and, after thorough mixing, extruding the combination through an appropriate die into a lower pressure atmosphere.

From about the 1950's to the present, physical blowing agents of choice have included halocarbons, hydrocarbons or combinations thereof. Examples of these include commercially available halocarbon compositions such as dichlorodifluoromethane, trichlorofluoromethane and mixtures thereof, and the $C_2$–$C_6$ hydrocarbons. During the 1980's, the worldwide scientific community presented sufficient evidence linking chlorofluorocarbons (CFCs) with atmospheric ozone depletion and sought governments to regulate CFCs. As of a result of such regulations, hydrocarbons are generally the choice of physical blowing agents.

There are two foams that are commonly produced. The first foam is made from polystyrene and the second foam is made from low density polyethylenes (LDPEs). Pure polystyrene foam is too brittle for some applications such as protective packaging which require protection from multiple impacts.

LDPE foams are generally considered to be resilient and non-brittle, which are desirable properties. The LDPE foams, however, have disadvantages such as adding a stability control agent (also referred to as a permeation modifier) to the polymeric composition so as to produce a commercially acceptable foam (e.g., a foam that does not change its dimensions significantly over time).

The amount of total residual blowing agent in the LDPE foam immediately after its manufacture is typically in the range of from about 5 to about 10 weight percent of the polymeric composition. This amount is dependent upon factors such as is the desired density of the foam and the selected blowing agent. This amount of total residual blowing agent generally produces a potentially flammable condition if the foam is located in a confined area. Typically, the aging process for an LDPE foam containing a stability control agent takes from about 14 to about 30 days. The aging process is dependent upon a number of factors including, but not limited to, the density of the foam, the selected blowing agent and storage temperature of the foam.

Accordingly, a need exists for foams that overcome the above-noted shortcomings associated with existing foams.

SUMMARY OF THE INVENTION

The polymeric composition to be used in producing foam of the present invention comprises from about 5 to 45 weight percent of a high density polyethylene (HDPE), from about 3 to about 45 weight percent alkenyl aromatic polymer, and from about 10 to about 85 of a resiliency modifier resin. The HDPE resin has a z-average molecular weight, $M_z$, greater than about 1,000,000. The foam of the present invention is produced with a stability control agent, generally in amounts less than traditional LDPE only foams.

According to one process for preparing a polymeric foam of the present invention, a high density polyethylene, an alkenyl aromatic polymer and a resiliency modifier resin are melted to form a polymeric composition. The polymeric composition comprises from about 5 to 45 weight percent of high density polyethylene, from about 3 to about 45 weight percent of alkenyl aromatic polymer and from about 10 to about 85 weight percent of the resiliency modifier resin. The high density polyethylene has a z-average molecular weight, $M_z$, greater than about 1,000,000. A stability control agent is added to the polymeric composition. An effective amount of blowing agent is dissolved to form a mixture. The mixture is transferred to an expansion zone and is permitted to expand in the expansion zone to produce the polymeric foam.

A polymeric foam of the present invention may be prepared by the above described steps. The polymeric foam has a cross-machine direction tensile toughness greater than about 33 KJ/m$^3$.

DESCRIPTION OF ILLUSTRATIVE EMBODIMENTS

The polymeric composition to be used in producing foam of the present invention comprises high density polyethylene (HDPE) from about 5 to 45 weight percent, alkenyl aromatic polymer from about 3 to about 45 weight percent, and a resiliency modifier resin from about 10 to about 85 weight percent. The preferred polymeric composition comprises HDPE from about 15 to about 40 weight percent, alkenyl aromatic polymer from about 10 to about 25 weight percent, and a resiliency modifier resin from about 60 to about 85 weight percent.

The most preferred polymeric composition comprises HDPE from about 15 to about 30 weight percent, alkenyl aromatic polymer from about 10 to about 20 weight percent, and a resiliency modifier resin from about 65 to about 75 weight percent. It is contemplated that more than one HDPE, alkenyl aromatic polymer and/or resiliency modifier resin can comprise the respective HDPE, alkenyl aromatic polymer and resiliency modifier resin weight percents of the polymeric composition. For example, two HDPE resins (each 15 weight percent) can be blended to comprise 30 weight percent HDPE of the polymeric composition.

HDPEs

The high density polyethylene (HDPE) of the present invention has a specific gravity of from about 940 to about 970 kg/m$^3$, and a z-average molecular weight, $M_z$, greater than about 1,000,000. The $M_z$ preferably is greater than about 1,200,000 and most preferably is greater than about 1,400,000. The z-average molecular weight ($M_z$) is characterized by a concentration of extremely high molecular weight polymer chains (i.e., those near an upper end of the molecular weight distribution).

The HDPE of the present invention generally has a melt flow index (MI) in the range of from about 0.05 to about 2.8 dg/min. as measured by ASTM D1238 (nominal flow rate at 190° C. and 198.2 kPA). In general, the high density ethylene polymer should have a melt flow index of less than about 10 dg/min., and preferably less than about 3 dg/min.

The preferred HDPE is uncrosslinked and has a specific gravity of from about 943 to about 951 kg/M$^3$, a melt flow index in the range of from about 0.18 to about 0.28 dg/min., a weight average molecular weight, $M_w$, in the range of from about 223,000 to about 233,000, a number average molecular weight, $M_n$, in the range of from about 12,500 to about 16,500, and a polydispersity index, $D=M_w/M_n$, from about 12 to about 20. The polydispersity index that is most preferred is from about 14 to about 18.

The HDPE of the present invention may be obtained by blending two or more HDPEs. For instance, an HDPE having an $M_z$ of 1,100,000 may be blended with a second HDPE having an $M_z$ of 1,500,000. It is contemplated that the HDPE of the present invention may include an HDPE having an $M_z$ of 800,000 blended with a second HDPE having an $M_z$ of 1,600,000 as long as the composite $M_z$ is greater than about 1,000,000. The most preferred HDPE has a bimodal distribution of molecular weight.

It is contemplated that the HDPE of the present invention may comprise a copolymer of at least 50 mole percent of a ethylene unit and a minor (i.e., less than 50%) proportion of a monomer copolymerizable with the ethylene unit. It is contemplated that the term HDPE of the present invention may also include physical blends of two or more different homopolymers that are classified as HDPEs or physical blends of at least 50 percent by weight of an ethylene homopolymer with another predominately high density polyethylenic copolymer. The physical blends are combined in a dry form after the blend components have previously been polymerized.

Alkenyl Aromatic Polymer

The term "alkenyl aromatic polymer" as used herein includes polymers of aromatic hydrocarbon molecules that contain an aryl group joined to an olefinic group with only double bonds in the linear structure, such as styrene, α-methylstyrene, o-methylstyrene, m-methylstyrene, p-methylstyrene, α-ethylstyrene, α-vinylxylene, α-chlorostyrene, α-bromostyrene, vinyl toluene and the like. Alkenyl aromatic polymers also include homopolymers of styrene (commonly referred to as polystyrene) and also copolymers of styrene and butadiene (commonly referred to as impact polystyrene).

The term "polystyrenic resin" or "polystyrenic material" as used herein includes homopolymers of styrene, and styrene copolymers comprised of at least 50 mole percent of a styrene unit (preferably at least about 70 mole percent) and a minor (i.e., less than 50%) proportion of a monomer copolymerizable with styrene. The term "polystyrenic resin" or "polystyrenic material" as used herein also includes blends of at least 50 percent by weight of the styrene homopolymer (preferably at least about 60 weight percent) with another predominately styrenic copolymer. The physical blends are combined in a dry form after the blends have previously been polymerized.

The polystyrenic resin that may be used in the polymeric composition includes any of those homopolymers obtained by polymerizing styrene to a weight average molecular weight ($M_w$) of from about 100,000 to about 450,000 (commonly referred to as crystal polystyrene), or may be any of those graft copolymers obtained by polymerizing a blend of polymerized styrene upon a nucleus of styrene-butadiene rubber (SBR) to a weight average molecular weight of from about 100,000 to about 350,000 (commonly referred to as impact polystyrene).

The preferred crystal polystyrenes are uncrosslinked and have a melt flow index of from about 0.5 to about 15.0 dg/min. as measured by ASTM D1238 (nominal flow rate at 200° C. and 689.5 kPa). The most preferred crystal polystyrene is uncrosslinked polystyrene having a melt flow index of from about 2.0 to about 8.0 dg/min.

Impact polystyrenes are generally classified as medium impact polystyrene (MIPS), high impact polystyrene (HIPS) or super high impact polystyrene (S-HIPS). The butadiene level of the impact polystyrene is preferably in the range from about 3 to about 10 weight percent of the copolymer (butadiene and polystyrene). The most preferred butadiene level is in the range of from about 5 to about 8 weight percent of the copolymer. The impact polystyrene generally has a melt flow index of less than about 25 dg/min., and preferably less than about 8 dg/min. The most preferred impact polystyrene is an uncrosslinked HIPS having a melt flow index of from about 2.2 to about 3.2 dg/min. as measured by ASTM D1238 (nominal flow rate at 200° C. and 689.5 kPa), and a Notched Izod Impact value of from about 9 to about 13 J/m as measured by ASTM D256. The Notched Izod Impact is the energy required to break notched specimens under standard conditions and is work per unit of notch. A higher Notched Izod Impact value, therefore, indicates a tougher material.

The alkenyl aromatic polymer of the present invention may be obtained by blending two or more alkenyl aromatic polymers. For example, blends of crystal polystyrene and impact polystyrenes, such as HIPS, may be blended to comprise the alkenyl aromatic polymer of the present invention.

Resiliency Modifier Resin

The term "resiliency modifier resin" as used herein includes resin(s) having a tactile feel as exemplified in low density foams made from LDPE. This includes, but is not limited to, LDPE, intermediate or medium density polyethylene (MDPE), ethylene ethyl acrylate (EEA), ethylene methyl acrylate (EMA), ethylene acrylic acid (EAA), ethylene methacrylic acid (EMAA), ethylene vinyl alcohol (EVOH), ethylene vinyl acetate (EVA), ionomer and combinations thereof. LDPE is generally defined as an ethylenic polymer having a specific gravity of from about 910 to about 925 kg/m$^3$. MDPE is generally defined as an ethylenic polymer having a specific gravity between the LDPEs and the HDPEs (i.e., from about 925 to about 940 kg/m$^3$).

The term LDPE as used herein includes homopolymers of ethylene and copolymers comprised of at least 50 mole percent of a ethylene unit (preferably at least 70 mole percent) and a minor (i.e. less than 50%) proportion of a monomer copolymerizable with the ethylene unit. The term LDPE as used herein also includes physical blends of two or more different homopolymers that are classified as LDPEs or physical blends of at least 50 percent by weight of an ethylene homopolymer (preferably at least about 60 weight percent) with another predominately low density polyethylenic copolymer. The physical blends are combined in a dry form after the resins have previously been polymerized. LDPE is the preferred resiliency modifier resin.

The LDPE resins that may be used in the foamable composition of the present invention include those obtained by polymerizing ethene which is commonly known as ethylene, or polymerizing ethylene with various other polymerizable monomers.

The preferred LDPEs are uncrosslinked and have a specific gravity of from about 915 to about 925 kg/m$^3$, and a melt flow index of from about 0.2 to about 3.8 dg/min. as measured by ASTM D1238 (nominal flow rate at 190° C. and 689.5 kPa). The low density ethylene polymer generally has a melt flow index of less than about 10 dg/min.

It is contemplated that resiliency modifier resins may be obtained by blending two or more resiliency modifier resins.

For example, two different LDPE resins may be blended together. Likewise, two or more resiliency modifier resins may be blended such as EEA and EMA.

Nucleating Agent

A nucleating agent, or cell size control agent, may be any conventional or useful nucleating agent(s). The amount of nucleating agent to be added depends upon the desired cell size, the selected blowing agent, and the density of the polymeric composition. The nucleating agent is generally added in amounts from about 0.02 to about 2.0 weight percent of the polymeric composition. Some contemplated nucleating agents include inorganic materials (in small particulate form), such as clay, talc, silica, and diatomaceous earth. Other contemplated nucleating agents include organic nucleating agents that decompose or react at the heating temperature within the extruder to evolve gas, such as carbon dioxide and/or nitrogen.

One example of an organic nucleating agent is a combination of an alkali metal salt of a polycarboxylic acid with a carbonate or bicarbonate. Some examples of an alkali metal salt of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate respectively), and the disodium salt of ethanedioic acid (commonly referred to as sodium oxalate) or polycarboxylic acid such as 2-hydroxy-1,2,3-propanetricarboxylic acid. Some examples of a carbonate or a bicarbonate include, but are not limited to, sodium carbonate, sodium bicarbonate, potassium bicarbonate, potassium carbonate and calcium carbonate.

One contemplated combination is a monoalkali metal salt of a polycarboxylic acid, such as monosodium citrate or monosodium tartrate, with a carbonate or bicarbonate. It is contemplated that mixtures of different nucleating agents may be added in the present invention. Preferred nucleating agents include talc, crystalline silica, and a stoichiometric mixture of citric acid and sodium bicarbonate (the stoichiometric mixture having a 1 to 100 percent concentration where the carrier is a suitable polymer such as low molecular weight polyethylene wax). Talc is preferably added in a carrier, but may also be added in a powder form. The most preferred nucleating agent is crystalline silica at about 18 to about 22 weight percent loading in a LDPE carrier which is added to produce a silica concentration in the foam from about 0.05 to about 0.1 weight percent.

Stability Control Agent

The polymeric foam of the present invention is made with a stability control agent(s). Some examples of stability control agents include, but are not limited to, a partial ester of a long chain fatty acid and a polyol, such as glycerol monostearate; certain borate or phosphinate glycol ester compounds such as tri(1-stearyl-glycero)borate, tri(monostearylpolyoxyethyleneglycol) borate, di( 1-stearylglycero) phosphinate; saturated higher fatty acid amides; saturated higher aliphatic amines and complete esters of saturated higher fatty acids, such as stearamide; N-higher aliphatic hydrocarbyl substituted amide of a $C_1$ to $C_8$ aliphatic carboxylic acid such as N-stearyl acetamide or N-stearyl caprylamide; certain higher aliphatic hydrocarbyl ether, ester or anhydride compounds such as behenic anhydride, distearyl ether, distearyl thioether, stearyl laurate and stearyl thiolaurate; certain naphthyl amine compounds such as N,N'-di-beta-naphthyl-paraphenylenediamine or N,N'-di-beta-naphthyl-paradiphenylenediamine, and glycerol monoester of a $C_{20}$–$C_{24}$ fatty acid. It is contemplated that mixtures of stability control agents may be used in the present invention.

Blowing Agents

It is contemplated that various blowing agents may be used in the present invention, including physical blowing agents such as hydrocarbons. The preferred physical blowing agents for this invention are organic chemical compounds that have boiling points less than about 37° C. These organic compounds include, but are not limited to, fully hydrogenated hydrocarbons and partially fluorinated hydrocarbons that are considered to be flammable. Flammable as defined herein generally includes those materials having flashpoints less than about 37.8° C.

The preferred fully hydrogenated hydrocarbon blowing agents include the initial members of the alkane series of hydrocarbons that contain up to five carbon atoms and which are not regulated by governmental agencies as being specifically toxic to human or plant life under normal exposure. These fully hydrogenated blowing agents include methane, ethane, propane, n-butane, isobutane, n-pentane, isopentane and blends thereof.

The most preferred fully hydrogenated hydrocarbon blowing agents are $C_2$ to $C_4$ compounds and blends thereof. An example of a preferred blend is a blend of approximately 67 weight percent n-butane and approximately 33 weight percent isobutane, which is commonly referred to in the industry as an A21 butane blend. This blend may be added at a rate of from about 1 to about 20 weight percent of the total extruder flow rate, and preferably added at a rate of from about 3 to about 15 weight percent of the total extruder flow rate.

It is contemplated that auxiliary blowing agents may be used in the present invention in amounts less than about 40 weight percent of the total blowing agent. The preferred auxiliary blowing agent are partially fluorinated hydrocarbon blowing agents that have molecules containing up to three carbon atoms without any other halogen atoms, and those considered flammable. For example, this includes 1,1-difluoroethane (HFC-152a), and 1,1,1-trifluoroethane (HFC-143a), with the most preferred auxiliary blowing agent being HFC-152a. It is also contemplated that 1-1-chlorofluoroethane (HFC-142b) and 1-1-dichloro-2-fluoroethane (HFC-141b) may be added as auxiliary blowing agents for non-regulated insulation applications.

In addition, water may optionally be added at a low concentration level as an auxiliary blowing agent. The water quality should be at least adequate for human consumption. Water containing a high level of dissolved ions may cause excessive nucleation, so therefore deionized water is preferred. The preferred rate for water addition is from about 0.05 to about 0.5 parts water to 100 parts of the polymeric composition (0.05 to 0.5 phr). The most preferred rate of adding water is from about 0.2 to about 0.3 phr.

It is contemplated that other additives may be added to the foamable composition, including, but not limited to, antistatics, coloring agents, fire retardants, antioxidants and plasticizers.

The Foamed Product

The polymeric foams produced with the invention composition generally have a density of from about 10 kg/m³ to about 150 kg/m³. These polymeric foams have properties that are similar to those found in LDPE foams in the art. The polymeric foams of the present invention are produced with consistently uniform physical properties. The polymeric foams are light in weight and may be used as protective or cushioning packaging for delicate goods such as computers, glassware, televisions, furniture, and any article that needs to be protected from gouging, surface-scratching or marring. Other contemplated applications for the polymeric foams of the present invention include uses in insulation, toys, floatation foam (e.g., life jackets) and recreational parts.

When producing polymeric foams having a density less than about 150 kg/m$^3$, a physical blowing agent, such as a hydrocarbon, is typically added at a rate of from about 2 to about 20 parts by weight to 100 parts of polymeric composition.

The polymeric foams of the present invention preferably have a thin cross-section. The term "thin cross-section" as used herein is defined as a dimension in the thickness direction of the foamed structure that is less than about 13 mm. The preferred dimension in the thickness direction of the present invention is from about 0.5 to about 13 mm. It is contemplated, however, that the polymeric foams of the present invention may have thicker cross-sections.

The foams of the present invention are "dimensionally" stable. Dimensional stability as defined herein is when the volume of the foam does not either deviate more than about 15 volume percent (i.e., does not either shrink more than about 15 volume percent or expand more than about 15 volume percent) from the volume of the polymeric foam at the time of production. The volume of the polymeric foam at the time of production is measured within about 15 minutes, and preferably within 10 minutes, after the foam exits the die. This measurement is used in determining the "fresh" density of the foam. To have a dimensionally stable product, the foam is typically measured after aging process for LDPEs (from about 14 to about 30 days) and compared to its fresh volume. It is recognized, however, that in the unlikely event that the foam at a later duration is not within about 15 volume percent of its fresh volume, then it is not a dimensionally stable product. It is preferable that the foam does not deviate more than about 10 volume percent from its "fresh" volume.

The foams of the present invention have a higher service temperature as compared to LDPE only foams. This higher service temperature enables a faster aging process for the foams of the present invention as compared to LDPE only foams because a higher storage temperature may be used without distorting the foam. In addition, foams of the present invention, because of their stability, generally need a lesser amount of stability control agent than LDPE only foams, resulting in a faster aging process.

The polymeric foams of the present invention are resilient and non-brittle. The term "brittleness" is defined in the art as being the inverse of toughness. Toughness is the ability of a material to resist breakage or fracture in the presence of an external force, such as compression, flexure or tension. Resiliency and non-brittleness can be characterized by a tensile toughness value.

Tensile toughness is represented by the area under the stress versus strain curve during tension and is measured in units of energy per specific volume (e.g., MJ/m$^3$ in SI units). The actual tensile toughness value for a given material structure is obtained by rigorous integration of the area under the stress versus strain curve.

The cross-machine direction (CMD) tensile toughness of the foam of the present invention is greater than about 33 KJ/m$^3$. The preferred CMD tensile toughness is greater than about 40 KJ/m$^3$, while the most preferred CMD tensile toughness is greater than about 50 KJ/m$^3$. The machine direction (MD) tensile toughness of the present invention is greater than about 80 KJ/m$^3$. The preferred MD tensile toughness is greater than about 120 KJ/m$^3$, while the most preferred MD tensile toughness is greater than about 160 KJ/m$^3$.

A Process of the Present Invention

According to one process of the present invention, pellets of HDPE(s), alkenyl aromatic polymer(s), and resiliency modifier resin(s) are loaded in their solid form into an extrusion hopper. The polymeric composition comprises HDPE(s) from about 5 to 45 weight percent, alkenyl aromatic polymer(s) from about 3 to about 45 weight percent and resiliency modifier resin(s) from about 10 to about 85 weight percent. The polymeric composition, along with about 0.1 to about 2.0 weight percent loading of pellets of 20% silica compounded in polyethylene (the nucleating agent), are fed by gravity into a extruder.

A stability control agent, such as glycerol monostearate, is added to the polymeric composition in an amount from about 0.25 to about 1.3 weight percent of the polymeric composition. The stability control agent is generally added in amounts less than traditional LDPE only foams. The polymeric composition preferably comprises from about 0.35 to 0.80 weight percent of glycerol monostearate. The polymeric-silica mixture is conveyed through a feed zone of the extruder and heated at a temperature sufficient to form a polymeric-silica melt.

A physical blowing agent is added at the injection port area of the extruder in an appropriate ratio to the target density. The polymeric-silica melt and the selected blowing agent are thoroughly mixed within the extruder in a mixing zone, and subsequently cooled in a cooling zone. The cooled polymeric-blowing agent melt is extruded through a die (a die appropriate to the desired product form) into a lower pressure region, then formed into the desired shape and thereafter cooled by convection with ambient air. The extruded tube may be slit by, for example, a conventional slitting machine to form a foam sheet. The foam sheet may optionally pass through a heating oven in which heated forced air is blown directly over its surfaces to reduce the residual blowing agent.

EXAMPLES

Preparation of Inventive Example 1

Pellets of Fina 2804 high density polyethylene (HDPE) (specific gravity of 0.946 g/cm$^3$; melt index [MI] of 0.23 dg/min.; M$_z$ of 1,500,000; and D=16.0), pellets of BASF 158L KG2 Crystal Polystyrene (specific gravity of 1.05 g/cm$^3$; and an MI of 2.5 dg/min.), and pellets of Millennium Petrothene® NA951-000 low density polyethylene (LDPE) (specific gravity of 0.919 g/cm$^3$; and a melt index of 2.3 dg/min.) were prepared in a weight ratio of 15:10:75. These pellets were mixed with 0.35 parts per hundred parts polymer of Schulman F20V crystalline silica concentrate based in LDPE, and heated in a 48:1 L:D NRM 4.5 inch (114.3 mm) single-screw extruder operating at a screw speed of about 71 rpm to form a blend. Pressurized commercial-grade, A21 butane blend (13.1 MPa) was injected at a rate of 39.5 kg/hr.

Pressurized city-supplied water (13.1 MPa) was injected at a rate of about 0.45 kg/hr. The blend, A21 butane blend and the water were thoroughly mixed within the extruder in the mixing zone. Subsequently, the extrudate was cooled to a melt temperature of about 137° C. at 8.27 MPa. The head pressure of the extruder was regulated by adjusting the extruder screw speed using a Normag 2200 gear pump control system. A melt pump increased the pressure of the extrudate to about 13.4 MPa for delivery at 236 kg/hr into the die.

Preparation of Inventive Example 2

The conditions of Example 1 were repeated, except the HDPE/polystyrene/LDPE resin blend ratio of Example 2 was changed from 15:10:75 to 40:15:45.

Preparation of Comparative Example 3

Pellets of Millennium LB5602-00 HDPE resin (specific gravity of 0.951 g/cm$^3$; MI of 0.09 dg/min.; $M_z$ of about 800,000; and D of about 6.6), pellets of Fina 825E High Impact Polystyrene (specific gravity of 1.04 g/cm$^3$; and a MI of 3.0 dg/min.), and pellets of Westlake LDPE 606 (specific gravity of 0.918 g/cm$^3$; and a MI of 2.0 dg/min.) were used. These pellets were mixed in a weight ratio of 50:20:30, and then mixed with 0.16 weight percent Schulman F20V crystalline silica concentrate to form a blend. The blend was heated in a 48:1 L:D Wilmington 3-inch (76 mm) single-screw extruder operating at a screw speed of 30 to 31 rpm. The A21 butane blend and the water were incorporated at the same levels as in Example 2.

The blend, A21 butane blend and water (extrudate) were cooled to a melt temperature of about 137° C. at 7.0 MPa. The head pressure of the extruder was regulated by a Normag 2200 gear pump system. A melt pump increased the pressure of the melt to 7.43 MPa for delivery at 37 kg/hr into the die.

Preparation of Comparative Example 4

The conditions of Example 3 were repeated, except that Millennium LS9020-46 HDPE resin (specific gravity of 0.951 g/cm$^3$; MI of 2.3 dg/min.; $M_z$ of about 450,000; and D of about 8) replaced the Millenium LB5602-00 HDPE resin.

Preparation of Comparative Example 5

The conditions of Example 4 were repeated, except that one-third of the Westlake 606 LDPE resin was replaced by Dupont Surlyn 9721 (a zinc-based ionomer of ethylene). The HDPE/HIPS/LDPE/ionomer weight ratio was 50:20:20:10.

Preparation of Comparative Example 6

Pellets of Millennium LS9020-46 HDPE (see Example 4 for resin data), pellets of Fina 945E High Impact Polystyrene (a specific gravity of 1.04 g/cm$^3$ and a MI of 3.5 dg/min.), and pellets of Westlake LDPE 606 (specific gravity of 0.918 g/cm$^3$; and a MI of 2.0 dg/min.) were prepared in a weight ratio of 50:20:30. These pellets were mixed with 0.22 parts per hundred parts polymer of Schulman F20V crystalline silica concentrate based in LDPE, and heated in a 32:1 L:D Berlyn 2.5 inch (35.3 mm) single-screw extruder operating at a screw speed of about 30 rpm to form a blend. Pressurized commercial-grade, A21 butane blend (22.1 MPa) was injected at a rate of 5.9 kg/hr.

Pressurized deionized water (22.1 MPa) was injected at a rate of about 0.1 to 0.15 kg/hr. The blend, A21 butane blend and the water were mixed and further heated to a melt temperature of about 227° C. and pressurized to 13.8 MPa at the extruder discharge. The heated mixture was then transferred through a heated pipe to a second, larger 3.5-inch (89 mm) single screw cooling extruder. Thus, this example was run on a tandem extrusion system. Subsequently, the extrudate was cooled to a melt temperature of about 137° C. at 7.0 MPa. The head pressure of the extruder was regulated by a Normag 2200 gear pump control system. A melt pump increased the pressure of the extrudate to about 7.43 MPa for delivery at 37 kg/hr into the die.

Preparation of Comparative Example 7

The conditions of Example 6 were repeated, except that the Millennium LS9020-46 HDPE was replaced with Mobil HYA-301 resin (specific gravity of 0.953 g/cm$^3$; MI of 0.34 dg/min.; $M_z$ of about 800,000; and D of about 7.8). The Fina 945E resin was replaced with Fina 825E High Impact Polystyrene (see Example 3 for resin data).

Preparation of Comparative Example 8

Pellets of Westlake 606 LDPE resin (specific gravity of 0.918 g/cm$^3$; and a MI of 2.0 dg/min.) were mixed with 0.35 parts per hundred parts polymer of Techmer T-1901 talc concentrate based in LDPE, and heated in a 48:1 L:D (NRM) 4.5-inch (114.3 mm) single-screw extruder operating at a screw speed of about 71 rpm. Pressurized Commercial-grade, A21 butane blend (13.1 Mpa) was injected at a rate of 39.5 kg/hr. Pressurized American Ingredients Company Pationic® 1052 (13.1 Ma), a fatty acid ester product of glycerol, at about 110° C. was injected at a rate of 1.0 kg/hr. The mixture was subsequently cooled to a melt temperature of about 137° C. at 8.27 MPa. The head pressure of the extruder was regulated by a Normag 2200 gear pump control system. The melt pump increased the pressure of the melt to 13.4 MPa for delivery at 236 kg/hr into the die.

Testing Results

The semi-molten extrudate of each of the Examples was then drawn over a mandrel. Samples of the resulting foam sheets had various properties that are shown in Table 1.

TABLE 1

| EXAMPLE No. | FOAM POLYMER COMPOSITION | Fresh Density (kg/m$^3$) | Fresh Thickness (mm) | Testing Age (days) | Aged Density (kg/m$^3$) | Aged Thickness (mm) | Cell Density (cell/cm) | MD Tensile Toughness (kPa) | CMD Tensile Toughness (kPa) |
|---|---|---|---|---|---|---|---|---|---|
| 1 | 15% Fina 2804 HDPE<br>10% BASE 158L PS<br>75% Millennium NA951-000 LDPE | 21.5 | 2.6 | 14 | 23.5 | 2.9 | 7.9 | 137 | 41 |
| 2 | 40% Fina 2804 HDPE<br>15% BASF 158L PS<br>45% Millennium NA951-000 LDPE | 21.5 | 2.3 | 14 | 21.9 | 2.9 | 11.8 | 87 | 40 |
| 3 | 50% Millennium LB5602-00<br>20% Fina 825E<br>30% Westlake 606 LDPE | 22.2 | 3.5 | 14 | 18.1 | 3.1 | 4.7 | 55 | 30 |
| 4 | 50% Millennium LS9020-46<br>20% Fina 825E | 20.2 | 2.4 | 12 | 13.9 | 3.1 | 15.7 | 135 | 19 |

TABLE 1-continued

| EXAMPLE No. | FOAM POLYMER COMPOSITION | Fresh Density (kg/m³) | Fresh Thickness (mm) | Testing Age (days) | Aged Density (kg/m³) | Aged Thickness (mm) | Cell Density (cell/cm) | MD Tensile Toughness (kPa) | CMD Tensile Toughness (kPa) |
|---|---|---|---|---|---|---|---|---|---|
| 5 | 30% Westlake 606 LDPE<br>50% Millenium LS9020-46<br>20% Fina 825E | 21.5 | 3.3 | 12 | 20.2 | 3.3 | 5.5 | 71 | 19 |
| 6 | 20% Westlake 606 LDPE<br>10% Dupont Surlyn 9721<br>50% Millenium LS9020-46<br>20% Fina 945E | 21.1 | 2.0 | 12 | 21.5 | 2.0 | 14.2 | 145 | 17 |
| 7 | 30% Westlake 606 LDPE<br>50% Mobil HYA-301<br>20% Fina 825E | 28.8 | 2.0 | 16 | 16.2 | 3.7 | 16 | 119 | 22 |
| 8 | 30% Westlake 606 LDPE<br>100% Westlake 606 LDPE | 17.8 | 3.0 | 18 | 18.3 | 2.9 | 7.1 | 221 | 61 |

Inventive Foam 1 had an average fresh density of about 21.5 kg/m³, an average foam thickness of about 2.6 mm, an average linear cell density of about 7.9 cells/cm. The properties of the foam sheet were measured within about 10 minutes of each example after the semi-molten extrudate had exited the die. For Inventive Foams 1 and 2, 3 samples (1 set of 3 cross-web samples) were evaluated to obtain the average fresh values. In the remaining examples (Examples 3–8), 4 samples (2 sets of 2 cross-web samples) were evaluated to obtain the fresh values. Each foam was visually inspected over the next three hours.

As shown in Table 1, the foam in each example was evaluated after different time intervals (see testing age). For instance, Inventive Foam 1 was evaluated after 14 days and had an average aged density of about 23.5 kg/m³, an average foam thickness of about 2.9 mm, and an average cross machine direction (CMD) tensile toughness of 41 kPa. Inventive Foam 1 showed a good dimensional stability of 9.3% ([21.5–23.5]/21.5). Inventive Foam 2 showed an excellent dimensional stability of 1.8% ([21.5–21.9]/21.5). Each of the Inventive Foams 1–2 showed an excellent CMD tensile toughness.

All of the Comparative Foams with an HDPE resin (Comparative Foams 3–7) did not have a desirable CMD tensile toughness. Comparative Foam 8 (LDPE resin only) did have a desirable CMD tensile toughness and was also dimensionally stable.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A process for preparing a polymeric foam, the process comprising:
   (a) melting a high density polyethylene, an alkenyl aromatic polymer and a resiliency modifier resin to form a polymeric composition, the polymeric composition comprising from about 5 to 45 weight percent of high density polyethylene, from about 3 to about 45 weight percent of alkenyl aromatic polymer and from about 10 to about 85 weight percent of the resiliency modifier resin, the high density polyethylene having a z-average molecular weight, $M_z$, greater than about 1,000,000;
   (b) adding a stability control agent to the polymeric composition;
   (c) dissolving an effective amount of blowing agent;
   (d) transferring the mixture of step (c) to an expansion zone; and
   (e) permitting the mixture of step (d) to expand in the expansion zone to produce the polymeric foam.

2. The process of claim 1, further including the step of adding a nucleating agent before step (d).

3. The process of claim 2, wherein the nucleating agent is selected from the group consisting of talc, crystalline silica, and a mixture of citric acid and sodium bicarbonate.

4. The process of claim 3, wherein the nucleating agent is crystalline silica.

5. The process of claim 1, wherein the blowing agent is chosen from the group consisting of methane, ethane, propane, n-butane, isobutane, n-pentane, and blends thereof.

6. The process of claim 5, wherein the blowing agent is chosen from the group of n-butane, isobutane and a blend thereof.

7. The process of claim 1, further including the step of adding a stability control agent before step (d).

8. The process of claim 7, wherein the stability control agent is glycerol monostearate.

9. A polymeric foam formed by the process of claim 1.

10. The process of claim 1, wherein the high density polyethylene is from about 15 to about 40 weight percent.

11. The process of claim 10, wherein the high density polyethylene is from about 15 to about 30 weight percent.

12. The process of claim 1, wherein the alkenyl aromatic polymer is from about 10 to about 25 weight percent.

13. The process of claim 12, wherein the alkenyl aromatic polymer is from about 10 to about 20 weight percent.

14. The process of claim 1, wherein the resiliency modifier resin is from about 60 to about 85 weight percent.

15. The process of claim 14, wherein the resiliency modifier resin is from about 65 to about 75 weight percent.

16. The process of claim 1, wherein the high density polyethylene is from about 10 to about 40 weight percent, the alkenyl aromatic polymer is from about 10 to about 25 weight percent and the resiliency modifier resin is from about 60 to about 85 weight percent.

17. The process of claim 16, wherein the high density polyethylene is from about 10 to about 30 weight percent, the alkenyl aromatic polymer is from about 10 to about 20 weight percent and the resiliency modifier resin is from about 65 to about 75 weight percent.

18. The process of claim 1, wherein the high density polyethylene has a z-average molecular weight greater than about 1,200,000.

19. The process of claim 18, wherein the high density polyethylene has a z-average molecular weight greater than about 1,400,000.

20. The process of claim 1, wherein the polydispersity index, D, is from about 12 to about 20.

21. The process of claim 20, wherein the polydispersity index is from about 14 to about 18.

22. The process of claim 1, wherein the high density polyethylene has a bimodal distribution of molecular weight.

23. The process of claim 1, wherein the alkenyl aromatic polymer is a polystyrenic resin.

24. The process of claim 23, wherein the polystyrenic resin is selected from the group consisting of homopolymers of styrene, copolymers of styrene and butadiene, and blends thereof.

25. The process of claim 1, wherein the resiliency modifier resin is selected from the group consisting of low density polyethylene, medium density polyethylene, ethylene ethyl acrylate, ethylene methyl acrylate, ethylene acrylic acid, ethylene methacrylic acid, ethylene vinyl alcohol, ethylene vinyl acetate, ionomer and combinations thereof.

26. The process of claim 25, wherein the resiliency modifier resin is a low density polyethylene or a medium density polyethylene.

27. The process of claim 26, wherein the resiliency modifier resin is a low density polyethylene.

28. The process of claim 26, wherein the resiliency modifier resin is a blend of at least two low density polyethylenes.

29. The process of claim 1, further including the step of adding at least one additive before step (d).

30. The process of claim 29, wherein at least one additive is selected from the group consisting of antistatics, coloring agents, fire retardants, antioxidants and plasticizers.

31. A polymeric foam prepared by the process comprising:
(a) melting a high density polyethylene, an alkenyl aromatic polymer and a resiliency modifier resin to form a polymeric composition, the polymeric composition comprising from about 5 to 45 weight percent of high density polyethylene, from about 3 to about 45 weight percent of alkenyl aromatic polymer and from about 10 to about 85 weight percent of the resiliency modifier resin, the high density polyethylene having a z-average molecular weight, $M_z$, greater than about 1,000,000,
(b) adding a stability control agent to the polymeric composition;
(c) dissolving an effective amount of blowing agent;
(d) transferring the mixture of step (c) to an expansion zone; and
(e) permitting the mixture of step (d) to expand in the expansion zone to produce the polymeric foam;
wherein the polymeric foam has a cross-machine direction tensile toughness greater than about 33 $KJ/m^3$.

32. The polymeric foam of claim 31, wherein the cross-machine direction tensile toughness is greater than about 40 $KJ/m^3$.

33. The polymeric foam of claim 32, wherein the cross-machine direction tensile toughness is greater than about 50 $Kj/m^3$.

34. The polymeric foam of claim 31, wherein the density of the polymeric foam is from about 10 $kg/m^3$ to about 150 $kg/m^3$.

35. The polymeric foam of claim 31, wherein the cross-section of the polymeric foam is less than about 13 mm.

36. The polymeric foam of claim 31, wherein the polymeric foam is dimensionally stable.

37. The polymeric foam of claim 31, wherein the high density polyethylene is from about 10 to about 40 weight percent.

38. The polymeric foam of claim 37, wherein the high density polyethylene is from about 10 to about 30 weight percent.

39. The polymeric foam of claim 31, wherein the high density polyethylene has a z-average molecular weight greater than about 1,200,000.

40. The polymeric foam of claim 39, wherein the high density polyethylene has a z-average molecular weight greater than about 1,400,000.

41. The polymeric foam of claim 31, further including the step of adding a nucleating agent before step (d).

42. The polymeric foam of claim 31, further including the step of adding a stability control agent before step (d).

43. The polymeric foam of claim 31, wherein the alkenyl aromatic polymer is from about 10 to about 25 weight percent.

44. The polymeric foam of claim 43, wherein the alkenyl aromatic polymer is from about 10 to about 20 weight percent.

45. The polymeric foam of claim 31, wherein the resiliency modifier resin is from about 60 to about 85 weight percent.

46. The polymeric foam of claim 45, wherein the resiliency modifier resin is from about 65 to about 75 weight percent.

47. The polymeric foam of claim 31, wherein the high density polyethylene is from about 10 to about 40 weight percent, the alkenyl aromatic polymer is from about 10 to about 25 weight percent and the resiliency modifier resin is from about 60 to about 85 weight percent.

48. The polymeric foam of claim 47, wherein the high density polyethylene is from about 10 to about 30 weight percent, the alkenyl aromatic polymer is from about 10 to about 20 weight percent and the resiliency modifier resin is from about 65 to about 75 weight percent.

49. The polymeric foam of claim 31, wherein the polydispersity index, D, is from about 12 to about 20.

50. The polymeric foam of claim 49, wherein the polydispersity index is from about 14 to about 18.

51. The polymeric foam of claim 31, wherein the high density polyethylene has a bimodal distribution of molecular weight.

52. The polymeric foam of claim 31, wherein the alkenyl aromatic polymer is a polystyrenic resin.

53. The polymeric foam of claim 52, wherein the polystyrenic resin is selected from the group consisting of homopolymers of styrene, copolymers of styrene and butadiene, and blends thereof.

54. The polymeric foam of claim 31, wherein the resiliency modifier resin is selected from the group consisting of low density polyethylene, medium density polyethylene, ethylene ethyl acrylate, ethylene methyl acrylate, ethylene acrylic acid, ethylene methacrylic acid, ethylene vinyl alcohol, ethylene vinyl acetate, ionomer and combinations thereof.

55. The polymeric foam of claim 54, wherein the resiliency modifier resin is a low density polyethylene or a medium density polyethylene.

56. The polymeric foam of claim 31, wherein the resiliency modifier resin is a low density polyethylene.

57. The polymeric foam of claim 31, wherein the resiliency modifier resin is a blend of at least two low density polyethylenes.

58. The polymeric foam of claim 31, further including the step of adding at least one additive before step (d).

* * * * *